March 1, 1927.
M. M. PLUMB
1,619,153
VEHICLE TOP CONSTRUCTION
Filed July 14, 1924
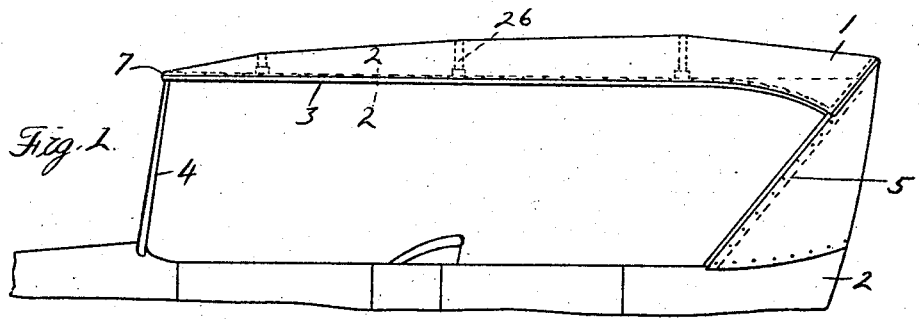
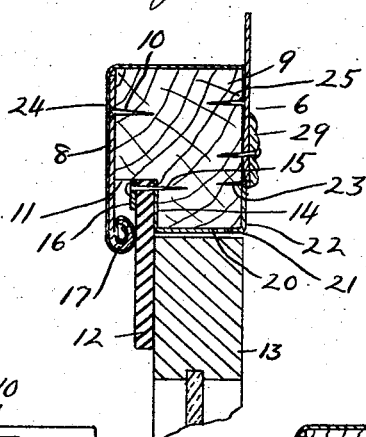
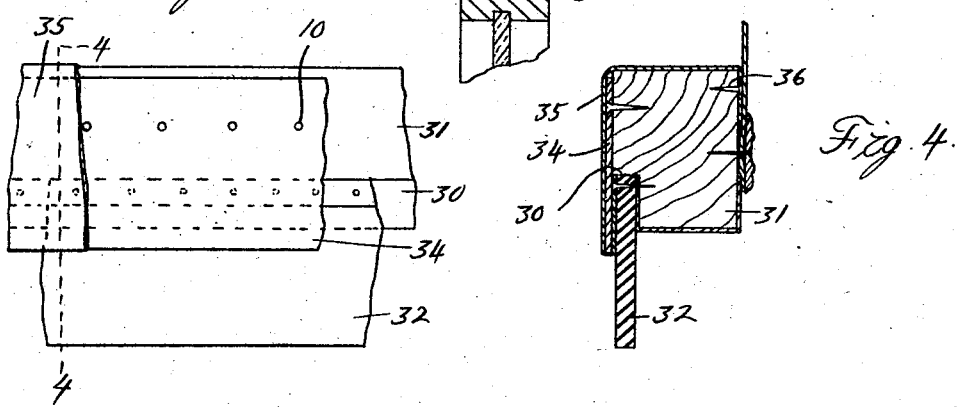
Inventor
Milton M. Plumb
By Whittemore Hulbert Whittemore
+ Belknap  Attorneys Patented Mar. 1, 1927.

1,619,153

UNITED STATES PATENT OFFICE.

MILTON M. PLUMB, OF DETROIT, MICHIGAN, ASSIGNOR TO AMERICAN AUTO TRIMMING COMPANY, OF DETROIT, MICHIGAN, A CORPORATION OF MICHIGAN.

VEHICLE TOP CONSTRUCTION.

Application filed July 14, 1924. Serial No. 725,978.

This invention relates generally to rigid or permanent tops for motor vehicles and consists of certain novel features of construction, combinations and arrangements of parts as will be more fully described and particularly pointed out in the appended claims.

In the accompanying drawing:

Figure 1 is a fragmentary side elevation of a vehicle embodying my invention.

Figure 2 is an enlarged sectional view taken on the line 2—2 of Figure 1.

Figure 3 is a fragmentary side elevation of a slightly modified form of the construction.

Figure 4 is a sectional view taken on the line 4—4 of Figure 3.

Referring now to the drawing in which like characters of reference designate corresponding parts throughout the several views, the numeral 1 designates a top embodying my invention mounted on a vehicle body 2 of the touring type. This top is preferably provided with a rigid horizontal frame 3 which is supported at its forward end on the usual windshield standards 4 projecting upwardly from the body at the forward end thereof, and is connected at its rear end to a rearwardly inclined bow 5 that extends upwardly from the body at the rear end thereof. The frame 3 may be constructed of any suitable material and preferably comprises the spaced longitudinally extending rails 6 and the forward cross bar 7.

Each rail preferably comprises a relatively narrow metallic strip 8 to which a suitable wooden tacking strip 9 is preferably secured by means of the nails 10. As shown, the tacking strip 9 is secured to the outer face of the metallic strip 8 so that the lower face of the strip 9 is disposed slightly above the lower edge of the strip 8 and is preferably provided at its lower inner edge with a longitudinally extending inverted substantially L-shaped channel 11 for receiving the upper edge of a suitable yieldable abutment strip 12 for the side curtains or window sections 13 of the vehicle. This abutment strip 12 is preferably formed of rubber and is secured to the vertical portion 14 of the channel 11 by means of the tacks 15. A suitable rubberized fabric strip 16 is preferably used to prevent the heads of the tacks 15 from being driven or pulled through the rubber strip 12.

For reinforcing the rubber abutment strips 12 at the point of contact by the upper edges of the window sections or enclosures 13, the metallic strips 8 are provided at their lower edges with outwardly extending return-bent portions or beads 17 for engagement with the inner face of the rubber abutment strips 12. Thus with this construction, the lower edge portions of the rubber abutment strips 12 will yield sufficiently to prevent injury to the wearing apparel of anyone entering or leaving the body of the vehicle, while the upper portions of the strips will be sufficiently braced and reinforced by the beads 17 to form proper abutments or stops for the upper ends of the side window sections 13 attached to the body. Furthermore, these rubber abutments will obviate rattling entirely at the point of contact with the window sections and will also serve as effective weather seals for preventing rain, dirt, dust, etc., from passing into the vehicle from the upper edges of the window sections.

To provide a neat and attractive appearance, the lower faces 20 of the wooden tacking strips 9 are preferably covered by suitable strips of rubberized fabric 21 which are preferably secured to the outer faces 22 of the strips and to the vertical portion 14 of the L-shaped channels 11 by means of suitable tacks 23. The metallic strips 8 are also preferably covered by suitable fabric lining 24 which is preferably secured at one edge between the return-bent portions 17 and the outer faces of the strips 8 and extends around the return-bent portions 17 and over the strips 8 and 9 respectively, and is secured by the tacks 25 to the outer faces of the strips 9 adjacent to the outer edges of the rubberized fabric strips 21. The covering material of the top is preferably supported upon suitable bows 26 extending upwardly from the frame 3 and is secured to the outer faces of the tacking strips 9, while suitable flexible beading or binding 29 is preferably used to conceal the joint between the covering material and the rubberized fabric strips 21. Any suitable means (not shown) may be employed for securing the rails 6 of the frame to the rearwardly inclined bow 5.

In Figures 3 and 4 of the drawing I have shown a slight modification in which the channel 30 at the lower inner edge of the tacking strip 31 is relatively narrow so that the rubber abutment strip 32 is preferably flush with the inner face of the tacking strip and abuts the outer face of the metallic strip 34 projecting downwardly from the inner face of the tacking strip. With this construction the fabric lining 35 is secured to the rubber abutment strip and tacking strip and extends over the strips 31 and 34 respectively and is secured by the tacks 36 to the outer face of the tacking strip similar to the lining 24.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. In a vehicle top construction, the combination with a frame having a metal rail, of a tacking strip secured to said rail, a bead at the lower edge of the rail, and a yieldable abutment strip for a side curtain secured to said tacking strip and bearing against said bead.

2. In a vehicle top construction, the combination with a frame having a metal rail, of a tacking strip secured to said rail, a flexible covering secured to a portion of said tacking strip, a yieldable abutment strip for a side curtain engaging said covering material and secured to said tacking strip, said abutment projecting below said rail, and a lining covering said rail and a portion of said tacking strip, a top covering secured to said tacking strip, and means for concealing the joint between said top covering and the first mentioned flexible covering.

3. In a vehicle top, the combination with a tacking strip having a longitudinally extending rabbet at its inner lower edge, of a metal rail secured to said strip and forming with the rabbet a channel, and a yieldable window abutment strip projecting downwardly from the channel and secured to one wall thereof, the said yieldable strip being in engagement with the rail.

4. In a vehicle top, the combination with a tacking strip having a longitudinally extending rabbet, of a yieldable window abutment strip secured to a wall of the rabbet and projecting below the rail, and a rigid backing for the strip secured to the inner face of the rail.

5. In a vehicle top, the combination with a tacking strip having a longitudinally extending rabbet, of a yieldable window abutment strip, means for securing the said yieldable strip to a wall of the rabbet, and a metal rail secured to the tacking strip above the rabbet therein and projecting down over the latter to form a brace for the said yieldable strip.

In testimony whereof I affix my signature.

MILTON M. PLUMB.